United States Patent
Heezen et al.

(10) Patent No.: US 7,501,360 B2
(45) Date of Patent: Mar. 10, 2009

(54) PULL MAT

(75) Inventors: Jan-Willem Heezen, Aalten (NL);
Theodorus Aloysius Woestman, Nijverdal (NL)

(73) Assignee: Ten Cate Nicolon B.V., Almelo (NL)

( * ) Notice: Subject to any disclaimer, the term of this patent is extended or adjusted under 35 U.S.C. 154(b) by 59 days.

(21) Appl. No.: 11/280,184

(22) Filed: Nov. 17, 2005

(65) Prior Publication Data

US 2007/0111623 A1    May 17, 2007

(51) Int. Cl.
*D03D 15/08* (2006.01)
(52) U.S. Cl. .................. 442/185; 442/181; 442/186
(58) Field of Classification Search .............. 442/181, 442/185, 186
See application file for complete search history.

(56) References Cited

U.S. PATENT DOCUMENTS

| 4,748,996 A * | 6/1988 | Combier ................ 139/415 |
| 4,868,040 A * | 9/1989 | Hallal et al. ............. 442/234 |
| 2005/0153098 A1 * | 7/2005 | Bhatnagar et al. ......... 428/113 |

* cited by examiner

*Primary Examiner*—Arti Singh
(74) *Attorney, Agent, or Firm*—Harness, Dickey & Pierce

(57) ABSTRACT

The invention relates to a pull mat for toadstool culture or tunnel composting, which pull mat comprises a fabric of warp and weft threads, wherein the fabric comprises at least one strip in longitudinal direction, which at least one strip has a higher tensile strength and lower stretch than the areas of the fabric adjacent to the at least one strip.

18 Claims, 1 Drawing Sheet

PULL MAT

BACKGROUND

The invention relates to a pull mat for toadstool culture or tunnel composting. Toadstools are cultivated on mats on which a nutrient substrate is arranged and on which the toadstools are cultivated. Such mats are pulled into the racks along with nutrient substrate and are pulled out of the racks again with the nutrient substrate after harvesting of the toadstools. One end of the pull mat, which can be up to 100 meters long, is herein pulled. In tunnel composting the pull mat is used to pull compost out of the composting tunnel.

The pull mats must have an open structure so that excess moisture can be discharged and sufficient air can be supplied so as to realize a good growth of the toadstools and a good composting process. It is usual to embody such pull mats as a fabric. The drawback with these fabrics is that, when a pull mat is pulled, the fabric begins to constrict as a result of the tensile stresses, whereby the edges of the substrate or compost crumble away and remain in the rack or tunnel. When such a pull mat is overloaded it tends to tear right through all at once, and there is no indication that the pull mat needs replacing. A torn pull mat moreover causes the usual problems, such as for instance the removal of the substrate or compost lying on the torn pull mat from the rack or tunnel.

SUMMARY

It is an object of the invention to provide an improved pull mat, in particular for toadstool culture or tunnel composting.

This object is achieved according to the invention with a pull mat comprising a fabric of warp and weft threads, wherein the fabric comprises at least one strip in longitudinal direction, which at least one strip has a higher tensile strength and lower stretch than the areas of the fabric adjacent to the at least one strip.

The at least one strip forms a pull belt with which the surrounding fabric areas are co-displaced. The tensile forces are thus transferred via the strip and no longer over the entire width of the fabric. Because the tensile forces are now transferred only by the at least one strip, the constriction of the whole pull mat is lower than in prior art pull mats. Furthermore, if the at least one strip were to rupture under the tensile forces, the surrounding fabric areas then take over the tensile forces at least temporarily. This prevents the pull mat becoming completely unusable all at once, with all the associated negative consequences as stated above.

In a preferred embodiment the at least one strip comprises mutually adjacent warp threads wherein the threads are woven in standard or straight manner. Straight warp threads are understood to mean warp threads which are inserted in the fabric in one straight line and not, as is standard in fabrics, in a more undulating manner. Straight arrangement of warp threads in a fabric is referred to as "straight warp" in the field. This is a generally known technique. It is found that by arranging the straight warp threads or standard, more undulating warp threads adjacently of each other in the strip, a higher tensile strength can be obtained than would be expected on the basis of the individual warp threads.

In a preferred embodiment the warp threads in the strip have a higher tensile strength and lower stretch than the other warp threads. It is here also found that a higher tensile strength than would be expected can be obtained by combining the warp threads with higher tensile strength and lower stretch. A tensively strong pull mat in particular becomes possible as a result, which mat can have very great lengths without the risk of breakage being increased.

In another embodiment the pull mat comprises at least one strip of ultra high molecular weight polyethylene fibres, for example, DYNEEMA™ fibres. Ultra high molecular weight polyethylene fibres such as DYNEEMA™ fibres have a particularly high tensile strength and are therefore very suitable for a pull mat according to the invention.

The invention further comprises a combination of a pull mat according to the invention and a layer of nutrient substrate or compost arranged on the pull mat. Toadstools can for instance be cultivated later on such a combination. With the pull mat according to, the invention it is possible to pull a very great length of nutrient substrate or compost into and out of a rack or composting tunnel without the risk of the pull mat breaking being too great, and wherein constriction and elongation are reduced.

BRIEF DESCRIPTION OF THE DRAWINGS

These and other features of the invention are further elucidated with reference to the accompanying drawings.

DETAILED DESCRIPTION OF EXAMPLE EMBODIMENTS

Figure 1:
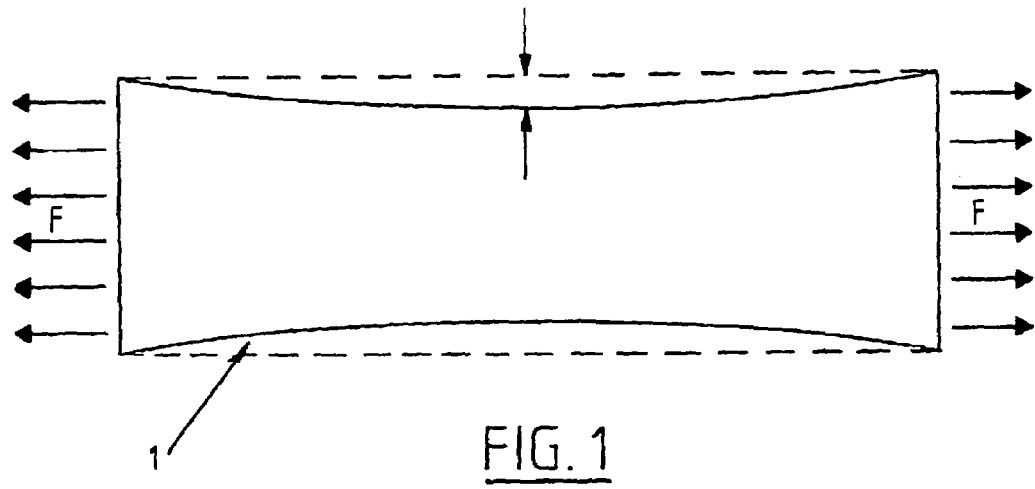
FIG. 1 shows a top view of a pull mat according to the prior art which is under strain of tension.

FIG. 1 shows a prior art pull mat 1. Such a pull mat 1 normally consists of a fabric which optionally incorporates uniformly distributed warp threads of for instance DYNEEMA™, which run in longitudinal direction of pull mat 1. When pull mat 1 is now loaded by a force F, pull mat 1 will now display constriction as a result of the structure as fabric. This constriction $i_1$ has a certain size.

Figure 2:
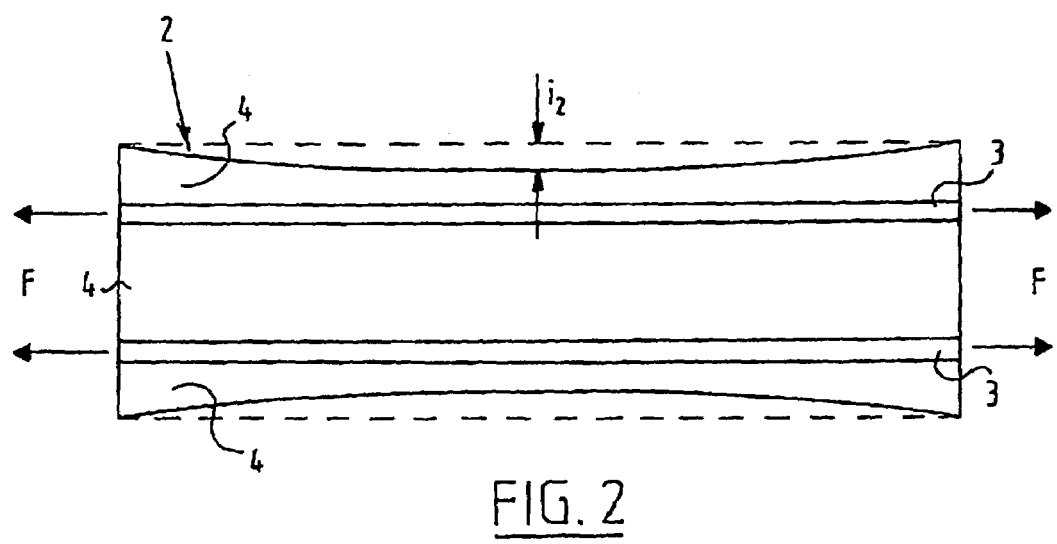
FIG. 2 shows a top view of a pull mat according to the invention under strain of tension.

FIG. 2 shows a pull mat 2 according to the invention. This pull mat 2 is likewise a fabric and has strips 3. These strips 3 are enclosed by surrounding fabric areas 4. Strips 3 have a greater tensile strength and lower stretch than the surrounding fabric areas 4. When pull mat 2 is now loaded in longitudinal direction by a force F, a constriction $i_2$ will likewise occur. The constriction $i_2$ is however considerably smaller than the constriction $i_1$ of the prior art pull mat 1.

Tests have been carried out to determine the advantages of the pull mat according to the invention. In these tests a prior art pull mat and a pull mat according to the invention were tested. The prior art pull mat was a fabric into which 248 ultra high molecular weight polyethylene DYNEEMA™ threads were woven in uniform distribution as warp threads.

The pull mat according to the invention was provided with two strips, each with 100 ultra high molecular weight polyethylene DYNEEMA™ threads woven in.

Both pull mats were then loaded and the constriction, elongation and tensile strength were measured. The results hereof are shown in table 1.

|              | Prior art | Invention |
| ------------ | --------- | --------- |
| Constriction | 6.0%      | 2.3%      |
| Elongation   | 6.0%      | 3.3%      |

-continued

|  | Prior art | Invention |
|---|---|---|
| Tensile strength DYNEEMA ™ | 85 kN/m | 100 kN/m |
| Total Tensile strength | 120 kN/m | 120 kN/m |

It was found that in the pull mat according to the invention the total tensile strength of the ultra high molecular weight polyethylene DYNEEMA™ fibres, which are arranged in strips, is higher than the total tensile strength of the ultra high molecular weight polyethylene DYNEEMA™ fibres in a pull mat according to the prior art, in which the fibres are evenly distributed. It is further found that both pull mats hereby have the same tensile strength, even though only 200 ultra high molecular weight polyethylene DYNEEMA™ threads are applied in the pull mat according to the invention, in contrast to the prior art pull mat which has 248 ultra high molecular weight polyethylene DYNEEMA™ threads. This is the effect obtained by arranging warp threads with higher tensile strength and lower stretch adjacently of each other in strips. It is further apparent that the constriction and elongation are reduced considerably in the pull mat according to the invention. This is the result of the strips with higher tensile strength.

Figure 3:
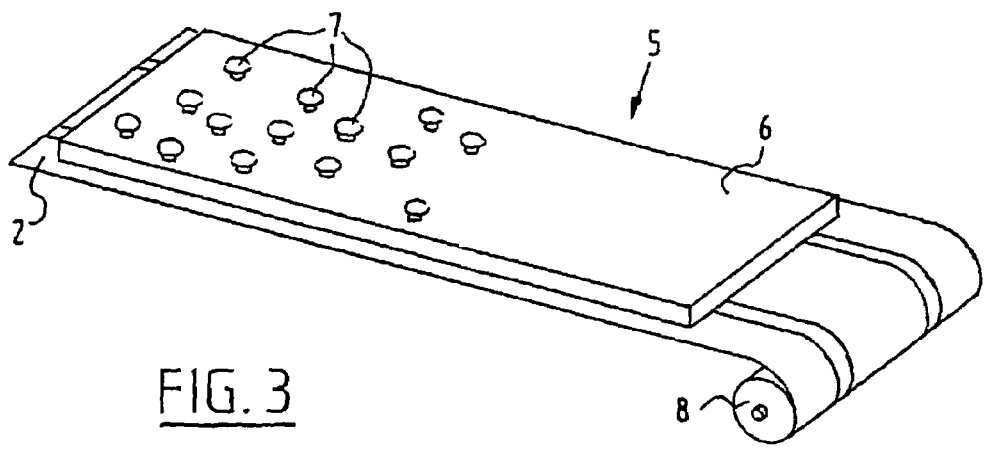
FIG. 3 shows a combination according to the invention.

FIG. 3 further shows a combination 5 according to the invention. This combination 5 has a pull mat 2 according to the invention and a substrate layer 6 arranged thereon. Toadstools 7 can for instance be cultivated on this substrate layer 6. Pull mat 2 is wound onto a roll 8, with which pull mat 2 can be pulled into and out of a rack or composting tunnel.

The invention claimed is:

1. A pull mat for a toadstool culture or tunnel composting, comprising:
   a fabric of warp and weft threads,
   at least one strip of the fabric having warp threads of a relatively higher tensile strength and a relatively lower stretch rate than adjacent portions of the fabric, the at least one strip woven in a uniform undulated distribution within adjacent portions of the fabric.

2. The pull mat of claim 1, wherein the at least one strip includes mutually adjacent, straight warp threads.

3. The pull mat of claim 1, wherein the at least one strip includes ultra high molecular weight polyethylene fibres.

4. A combination of the pull mat of claim 1 and a layer of nutrient substrate arranged on the pull mat.

5. The combination of claim 4, wherein the nutrient substrate includes compost.

6. The pull mat of claim 2, wherein the at least one strip includes ultra high molecular weight polyethylene fibres.

7. The pull mat of claim 1, wherein the at least one strip includes ultra high molecular weight polyethylene fibres.

8. A combination of the pull mat of claim 2 and a layer of nutrient substrate arranged on the pull mat.

9. A combination of the pull mat of claim 1 and a layer of nutrient substrate arranged on the pull mat.

10. A combination of the pull mat of claim 3 and a layer of nutrient substrate arranged on the pull mat.

11. The pull mat of claim 1, wherein the least one strip forms a pull-belt.

12. The pull mat of claim 1, wherein the at least one strip is enclosed by surrounding first fabric areas.

13. The pull mat of claim 1, wherein the at least one strip of the fabric includes two strips along parallel opposite sides of the mat.

14. The pull mat of claim 1, wherein the at least one strip of the fabric includes at least one strip of fabric having warp threads of a relatively lower tensile strength than adjacent portions of the fabric.

15. An apparatus, comprising:
    a pull mat having a fabric of warp and weft threads, at least one strip of the fabric having a relatively higher tensile strength and relatively lower stretch rate than adjacent portions of the first fabric, the at least one strip woven in a uniform undulated distribution within adjacent portions of the fabric.

16. A pull mat for a toadstool culture or tunnel composting comprising:
    a fabric of warp and weft threads, the warp threads including a first type of a relatively higher tensile strength and a relatively lower stretch rate than adjacent portions of the fabric and a second type of a relatively lower tensile strength than adjacent portions of the fabric.

17. The pull mat of claim 16, wherein the at least one strip forms a pull-belt.

18. The pull mat of claim 16, wherein the at least one strip is enclosed by surrounding fabric areas.

* * * * *